(12) United States Patent
Mochizuki et al.

(10) Patent No.: US 7,024,487 B2
(45) Date of Patent: Apr. 4, 2006

(54) ASSISTANT SERVER AND PATH CONNECTION CONTROL METHOD FOR SERVICE PROVIDER'S NETWORK

(75) Inventors: Misato Mochizuki, Yokohama (JP); Akihiko Takase, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 676 days.

(21) Appl. No.: 09/943,511

(22) Filed: Aug. 31, 2001

(65) Prior Publication Data

US 2003/0005148 A1    Jan. 2, 2003

(30) Foreign Application Priority Data

Jun. 29, 2001    (JP) .............................. 2001-197687

(51) Int. Cl.
  *G06F 15/173*    (2006.01)
(52) U.S. Cl. ..................... 709/238; 370/230; 370/468; 725/118
(58) Field of Classification Search ................ 370/230, 370/468, 409; 725/118; 707/10, 104; 709/238, 709/224–229, 240, 241, 237, 249, 223
  See application file for complete search history.

(56) References Cited

U.S. PATENT DOCUMENTS

| | | | | |
|---|---|---|---|---|
| 5,948,069 A | * | 9/1999 | Kitai et al. ................. | 709/240 |
| 6,023,730 A | * | 2/2000 | Tani ............................ | 709/231 |
| 6,167,449 A | * | 12/2000 | Arnold et al. ............... | 709/227 |
| 6,363,411 B1 | * | 3/2002 | Dugan et al. ................ | 709/202 |
| 6,442,547 B1 | * | 8/2002 | Bowman-Amuah .......... | 707/10 |
| 6,754,214 B1 | * | 6/2004 | Mahalingaiah .............. | 370/392 |

OTHER PUBLICATIONS

Bandwidth.com Wholesale.
RateXchange.
Enron Broadband Service.
ACE-Asia.

* cited by examiner

*Primary Examiner*—Jeffrey Pwu
(74) *Attorney, Agent, or Firm*—Mattingly, Stanger, Malur & Brundidge, P.C.

(57) ABSTRACT

In a communication network having a communication node connected to a plurality of service providers' networks, a network controller connected to the communication node, and a server for supplying network control information to the network controller, the server stores definition information of communication services provided by the service providers. When a service request specifying a communication path to be assured is received from the user terminal, the server retrieves communication service definition information matched with the service request and notifies the search result to the user terminal. In response to a notification of agreement from the user terminal, the server transmits network control information for setting a communication path to the network controller and the network controller supplies communication path control information generated on the basis of the network control information to the communication node.

3 Claims, 13 Drawing Sheets

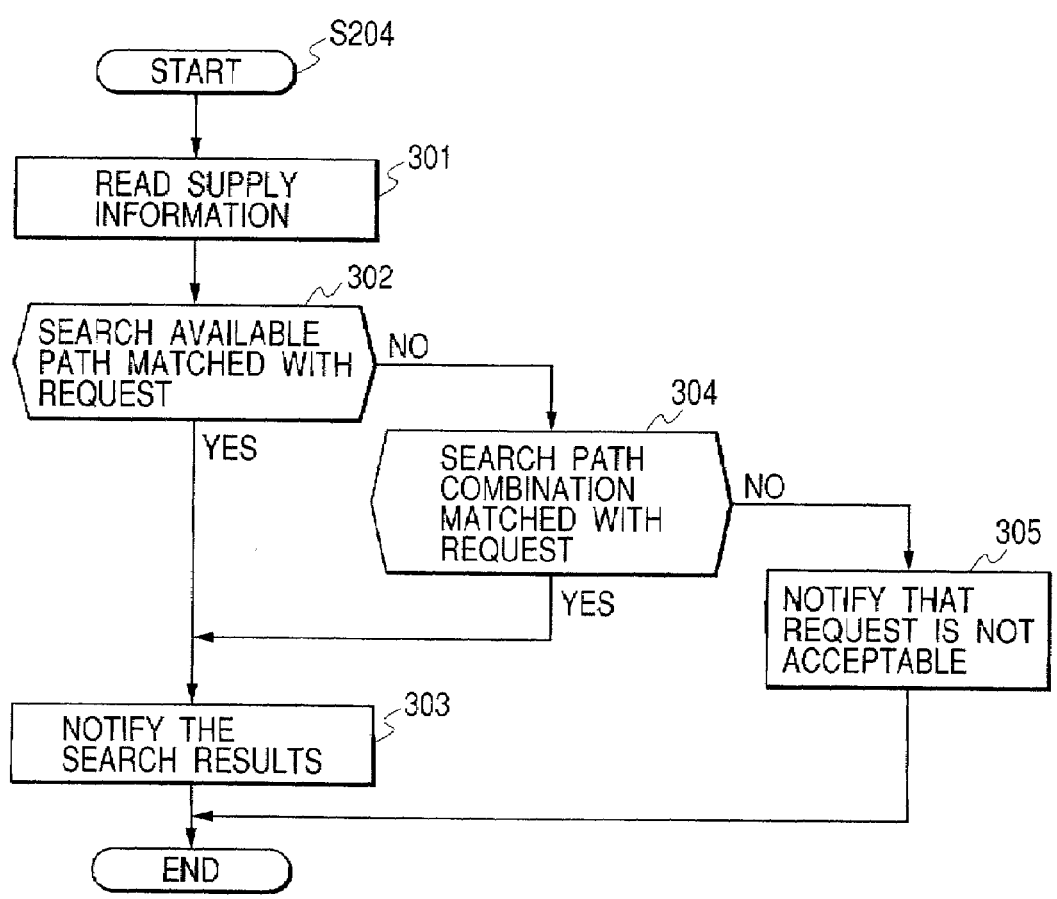

FIG. 4

SUPPLY INFORMATION DATABASE 102

| SERVICE PROVIDER 400 | SERVICE AREA 401 | SERVICE TERM 402 | BANDWIDTH (bps) 403 | QOS 404 | SERVICE SHARE 405 | |
|---|---|---|---|---|---|---|
| a | TOKYO—OSAKA | 2001/04/01—2003/03/31 | 2M | GUAR-ANTEED | OK | —102a |
| b | TOKYO—OSAKA | 2001/04/01—2003/03/31 | 3M | GUAR-ANTEED | OK | —102b |
| c | TOKYO—OSAKA | 2001/06/01—2003/06/30 | 2M | BEST EFFORT | OK | —102c |
| d | TOKYO—OSAKA | 2001/06/01—2003/06/30 | 3M | BEST EFFORT | OK | —102d |
| e | TOKYO—OSAKA | 2001/09/01—2002/08/31 | 1M | TOP PRIORITY | OK | —102e |
| f | TOKYO—OSAKA | 2002/09/01—2003/08/31 | 1M | TOP PRIORITY | OK | —102f |
| g | TOKYO—OSAKA | 2001/10/01—2005/08/31 | 5M | TOP PRIORITY | OK | —102g |
| h | TOKYO—OSAKA | 2001/10/01—2005/08/31 | 5M | TOP PRIORITY | OK | —102h |
| ⋮ | ⋮ | ⋮ | ⋮ | ⋮ | ⋮ | |

FIG. 5

103
DEMAND INFORMATION DATABASE

| USER 500 | SERVICE AREA 501 | SERVICE TERM 502 | BANDWIDTH (bps) 503 | QOS 504 | BACKUP ROUTE 505 | COMBINATION SERVICE 506 | SOURCE ADDRESS 507 | DESTINATION ADDRESS 508 | |
|---|---|---|---|---|---|---|---|---|---|
| A | TOKYO—OSAKA | 2001/04/01—2003/03/31 | 5M | GUAR-ANTEED | NO | OK | 1h | 1b | ~103a |
| B | TOKYO—OSAKA | 2001/06/01—2003/06/30 | 4M | BEST EFFORT | NO | OK | 2h | 2b | ~103b |
| C | TOKYO—OSAKA | 2001/06/01—2003/06/30 | 1M | BEST EFFORT | NO | OK | 3h | 3b | ~103c |
| D | TOKYO—OSAKA | 2001/09/01—2003/08/31 | 1M | TOP PRIORITY | NO | OK | 4h | 4b | ~103d |
| E | TOKYO—OSAKA | 2001/10/01—2005/08/31 | 5M | TOP PRIORITY | YES | OK | 5h | 5b | ~103e |
| ... | ... | ... | ... | ... | ... | ... | ... | ... | |

FIG. 6

NETWORK CONTROL INFORMATION DATABASE 104

| | SOURCE ADDRESS 612 | DESTINATION ADDRESS 613 | SERVICE TERM 601 | SERVICE AREA 602 | SERVICE ID 603 | FIRST PATH DEFINITION 604 | | | SECOND PATH DEFINITION 605 | | | QOS 610 | BACKUP ROUTE 611 | |
|---|---|---|---|---|---|---|---|---|---|---|---|---|---|---|
| USER 600 | | | | | | SERVICE PROVIDER 606A | BANDWIDTH (bps) 607A | PATH ID 608A | SERVICE PROVIDER 606B | BANDWIDTH (bps) 607B | PATH ID 608B | | | |
| A | 1h | 1b | 2001/04/01 – 2003/03/31 | TOKYO – OSAKA | 1 | a | 2M | 1 | b | 3M | 2 | GUAR-ANTEED | NO | 104a |
| B | 2h | 2b | 2001/06/01 – 2003/06/30 | TOKYO – OSAKA | 2 | c | 1.6M | 3 | d | 2.4M | 4 | BEST EFFORT | NO | 104b |
| C | 3h | 3b | 2001/06/01 – 2003/06/30 | TOKYO – OSAKA | 3 | c | 0.4M | 5 | d | 0.6M | 6 | BEST EFFORT | NO | 104c |
| D | 4h | 4b | 2001/09/01 – 2002/08/31 | TOKYO – OSAKA | 4 | e | 1M | 7 | – | – | – | TOP PRIORITY | NO | 104d |
| D | 4h | 4b | 2002/09/01 – 2003/08/31 | TOKYO – OSAKA | 4 | f | 1M | 8 | – | – | – | TOP PRIORITY | NO | 104D |
| E | 5h | 5b | 2001/10/01 – 2005/08/31 | TOKYO – OSAKA | 5 | g | 5M | 9 | – | – | – | TOP PRIORITY | NO | 104e |
| E | 5h | 5b | 2001/10/01 – 2005/08/31 | TOKYO – OSAKA | 5 | h | 5M | 10 | – | – | – | TOP PRIORITY | YES | 104E |

FIG. 9

| INPUT OF SUPPLY INFORMATION | | |
|---|---|---|
| 81 — NAME OF SERVICE PROVIDER | | a |
| 82 — SERVICE AREA | FROM | TOKYO |
| | TO | OSAKA |
| 83 — SERVICE TERM | FROM | 2001/04/01 |
| | UNTIL | 2003/03/31 |
| 84 — BANDWIDTH (bps) | | 2 Mbps |
| 85 — QOS | | GUARANTEED |
| 86 — SERVICE SHARE | | OK |

CANCEL (B10)   ENTER (B11)

| INPUT OF SERVICE REQUEST | | |
|---|---|---|
| 91 — NAME OF USER | | A |
| 92 — SERVICE AREA | FROM | TOKYO |
| | TO | OSAKA |
| 93 — SERVICE TERM | FROM | 2001/04/01 |
| | UNTIL | 2003/03/31 |
| 94 — BANDWIDTH (bps) | | 5 Mbps |
| 95 — QOS | | GUARANTEED |
| 96 — COMBINATION SERVICE | | YES |
| 97 — BACKUP ROUTE | | NO |
| 98 — SOURCE ADDRESS | | 1h |
| 99 — DESTINATION ADDRESS | | 1b |

CANCEL — B12

ENTER — B13

● YOUR REQUEST IS AS FOLLOWS

| NAME OF USER | | A |
|---|---|---|
| SERVICE AREA | FROM | TOKYO |
| | TO | OSAKA |
| SERVICE TERM | FROM | 2001/04/01 |
| | UNTIL | 2003/03/31 |
| BANDWIDTH (bps) | | 5 Mbps |
| QOS | | GUARANTEED |
| COMBINATION SERVICE | | YES |
| BACKUP ROUTE | | YES |
| SOURCE ADDRESS | | 1h |
| DESTINATION ADDRESS | | 1b |

● SEARCH RESULT FOR YOUR REQUEST IS AS FOLLOWS

| SERVICE PROVIDER (1) | BANDWIDTH | SERVICE PROVIDER (2) | BANDWIDTH | REQUESTED QOS |
|---|---|---|---|---|
| a | 2 Mbps | b | 3 Mbps | GUARANTEED |

131, 132, 133, 134, 135

[ORDER] [CHANGE OF REQUEST/RE-SEARCH] [END]

B14, B15, B16

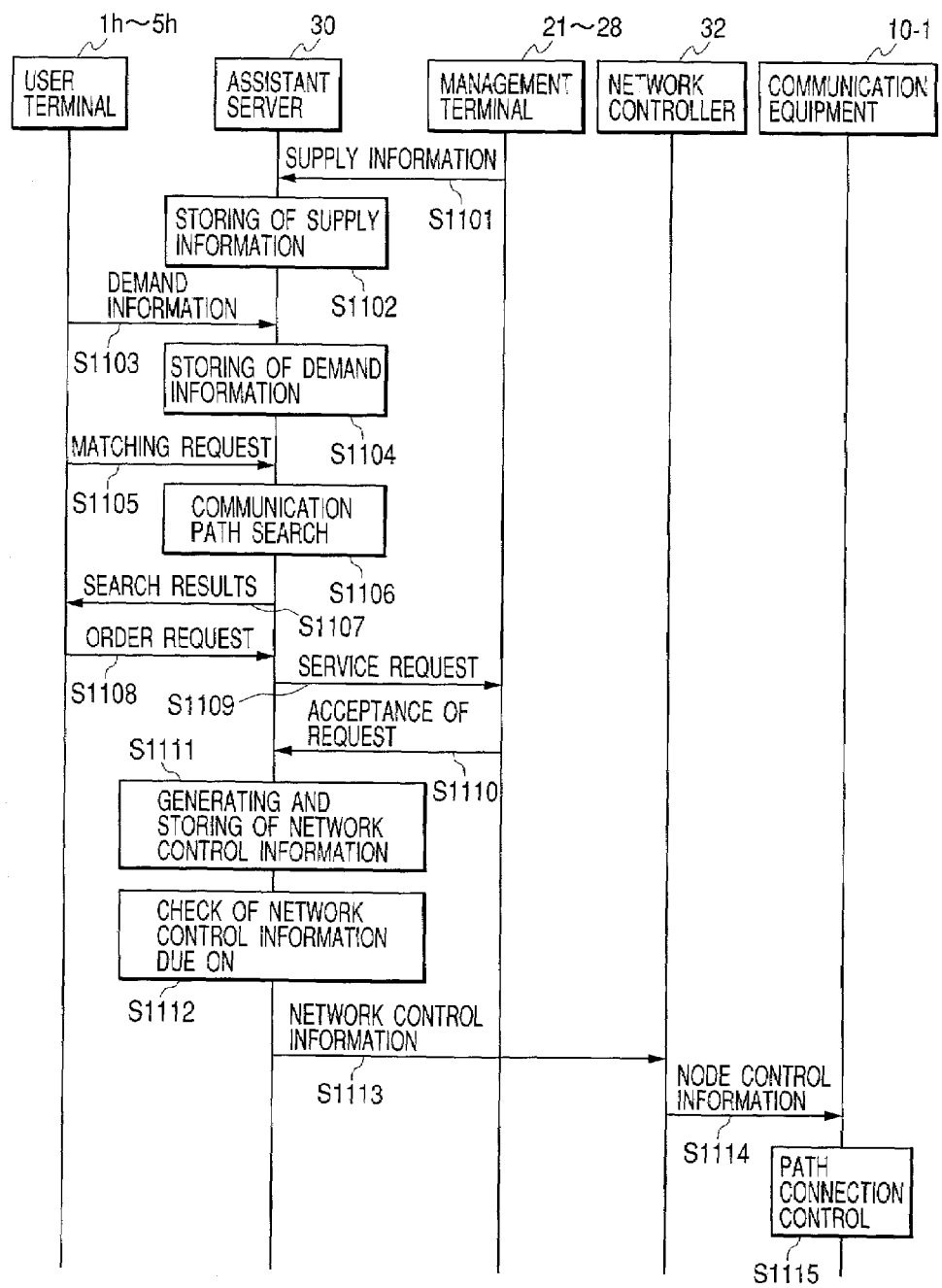

US 7,024,487 B2

ASSISTANT SERVER AND PATH CONNECTION CONTROL METHOD FOR SERVICE PROVIDER'S NETWORK

BACKGROUND OF THE INVENTION (1) Field of the Invention

The present invention relates to an assistant server and a path connection control method for a telecommunication company's network or a service provider's network. More particularly, the invention relates to an assistant server and a path connection control method for receiving a communication service request from a user terminal and connecting the user terminal to a communication path which matches the request in a communication network constructed by a plurality of communication service networks.

(2) Description of the Related Art

In recent years, with the rapid spread of the Internet and the emergence of various network applications of E-mail and the like, a network user has come to be able to perform various works such as a settlement work on the communication network. As the number of network users increases, the communication services on the networks required by the users are becoming various.

For example, there is a demand of a service of transferring a large amount of information such as, not only voice data transferred over a conventional telephone network, but also file data, video data, and data of HDTV (High Definition Television) which is called a television of the next generation. In order to transfer the information over a network, in the case of voice data, a bandwidth (line capacity) of 32 kbps (bits per second) is necessary as an average. In the case of a file transfer, a bandwidth of 1 Mbps is necessary. In the case of video data transfer, a bandwidth of 2 to 10 Mbps is necessary. In the case of HDTV data transfer, a bandwidth of 20 to 100 Mbps is necessary.

In the case of file transfer, at the time of a request of transferring a file issued from the user to a file server and at the time of transferring file data from a file server to a user terminal, data is transferred in a burst manner. After a file transfer is finished, until the next request is issued, the communication is stopped. Consequently, it is desired to effectively use the communication line resources (bandwidth). When it is desired to assure the reliability of communication, double communication lines or a function of bypassing a failed line is requested so that communication is not stopped immediately even if a failure occurs in a part of a network.

Conventionally, when a user desires to change the conditions of communication service assured on a network, the user makes a new contract with a telecommunication company or a communication service provider having a network, thereby reconstructing the communication path for the user.

In the conventional technique, therefore, it takes time to make a new contract with a telecommunication company or a communication service provider, so that various communication services requested by the user cannot be immediately provided. According to the conventional techniques, communication services which are becoming various more and more in future require a significant capital investment, so that it is uneconomical to telecommunication companies.

SUMMARY OF THE INVENTION

An object of the invention is to provide a method of processing a communication service request, a communication path control method, and a communication system capable of instantly addressing a communication service requested by the user.

Another object of the invention is to provide a method of processing a communication service request, a communication path control method, and an assistant server capable of effectively utilizing an existing network of a telecommunication company or a service provider.

Further another object of the invention is to provide a method of processing a communication service request, a communication path control method, and a communication system capable of effectively utilizing an excessive bandwidth which fluctuates according to the state of a network.

To achieve the objects, according to the invention, a communication service request for establishing a communication path is received from a user terminal by an assistant server connected to a network controller. When communication service matched with the user request is retrieved, network control information for establishing a communication path designated by the user request is supplied from the assistant server to the network controller, and a node control instruction for establishing the communication path is issued from the network controller to the communication node to which the user terminal is connected.

More specifically, according to the invention, there is provided a communication path control method in a communication network having a communication equipment or node connected to a plurality of telecommunication companies' networks, a network controller connected to the communication equipment, and a server for supplying network control information to the network controller, the network controller supplying communication path control information generated on the basis of the network control information to the communication equipment, comprising the steps of:

storing information entries each indicative of definition of communication services provided by each of the telecommunication companies' networks into the server;

issuing a communication service request, in which specifications of a communication path to be assured for a user terminal connected to the communication equipment are designated, from the user terminal to the server;

retrieving an information entry of the communication service definition matched with the communication service request and notifying the user terminal of a search result by the server; and transmitting network control information generated on the basis of the communication service request and retrieved communication service definition from the server to the network controller in response to a notification of agreement from the user terminal to the search result.

According to the invention, for example, when an information entry of communication service definition matched with the communication service request is not retrieved, the server notifies the user terminal of, as the search result, a combination of communication service definition of a plurality of entries, thereby to satisfy the communication service request with said combination.

Further, according to the invention, there is provided a communication service request processing method for a communication network including a communication equipment connected to a plurality of telecommunication companies' networks and a network controller connected to the communication equipment, comprising the steps of:

transmitting information indicative of definition of communication service from a management terminal of each telecommunication company's network to an assistant server connected to the network controller;

storing communication service definition information received from the management terminal as a supply information entry by the assistant server;

issuing a communication service request, in which specifications of a communication path to be assured for a user terminal connected to the communication equipment are designated, from the user terminal to the assistant server;

retrieving an information entry of the communication service definition matched with the communication service request and notifying the user terminal of a search result by the assistant server;

after receiving a notification of agreement from the user terminal to the search result, transmitting network control information for establishing a communication path designated by the communication service request from the assistant server to the network controller; and supplying communication path control information generated on the basis of the network control information from the network controller to the communication equipment.

According to the invention, there is also provided a server for performing communication with a user terminal via a communication network and supplying network control information to a network controller for controlling a communication node connected to both the user terminal and a plurality of telecommunication companies' networks, comprising:

memory means for storing information entries each indicative of definition of communication service provided by each of the telecommunication companies' networks;

first means for receiving a communication service request in which specifications of a communication path to be assured for a user terminal are designated, from the user terminal, searching the memory means for an information entry of communication service definition matched with the communication service request, and notifying the user terminal of a search result; and second means for transmitting network control information generated on the basis of the communication service request and the retrieved communication service definition to the network controller in response to a notification of agreement from the user terminal to the search result, wherein the network controller instructs the communication node in response to network control information received from the server to establish a communication path so that transmission packets from the user terminal are transferred to a telecommunication company's network which provides communication service definition matched with the communication service request.

BRIEF DESCRIPTION OF THE DRAWINGS

FIG. 3 is a flowchart showing a detailed procedure of a searching step S204 in FIG. 2.

FIG. 4 is a diagram showing the contents of a supply information database 102 of an assistant server 30.

FIG. 5 is a diagram showing the contents of a demand information database 103 of the assistant server 30.

FIG. 6 is a diagram showing the contents of a network control information database 104 of the assistant server 30.

FIG. 9 is a diagram showing an example of an entry screen of supply information in a management terminal.

FIG. 10 is a diagram showing an example of an entry screen of a service request (demand information) at a user terminal.

FIG. 11 is a diagram showing an example of a display screen of a search result displayed on the user terminal.

FIG. 13 is a diagram showing another embodiment of the control sequence in the communication network system according to the invention.

DESCRIPTION OF THE PREFERRED EMBODIMENTS

Embodiments of a method of processing a communication service request, a communication path control method, and a communication system according to the invention will be described in detail hereinbelow with reference to the drawings.

Figure 1:
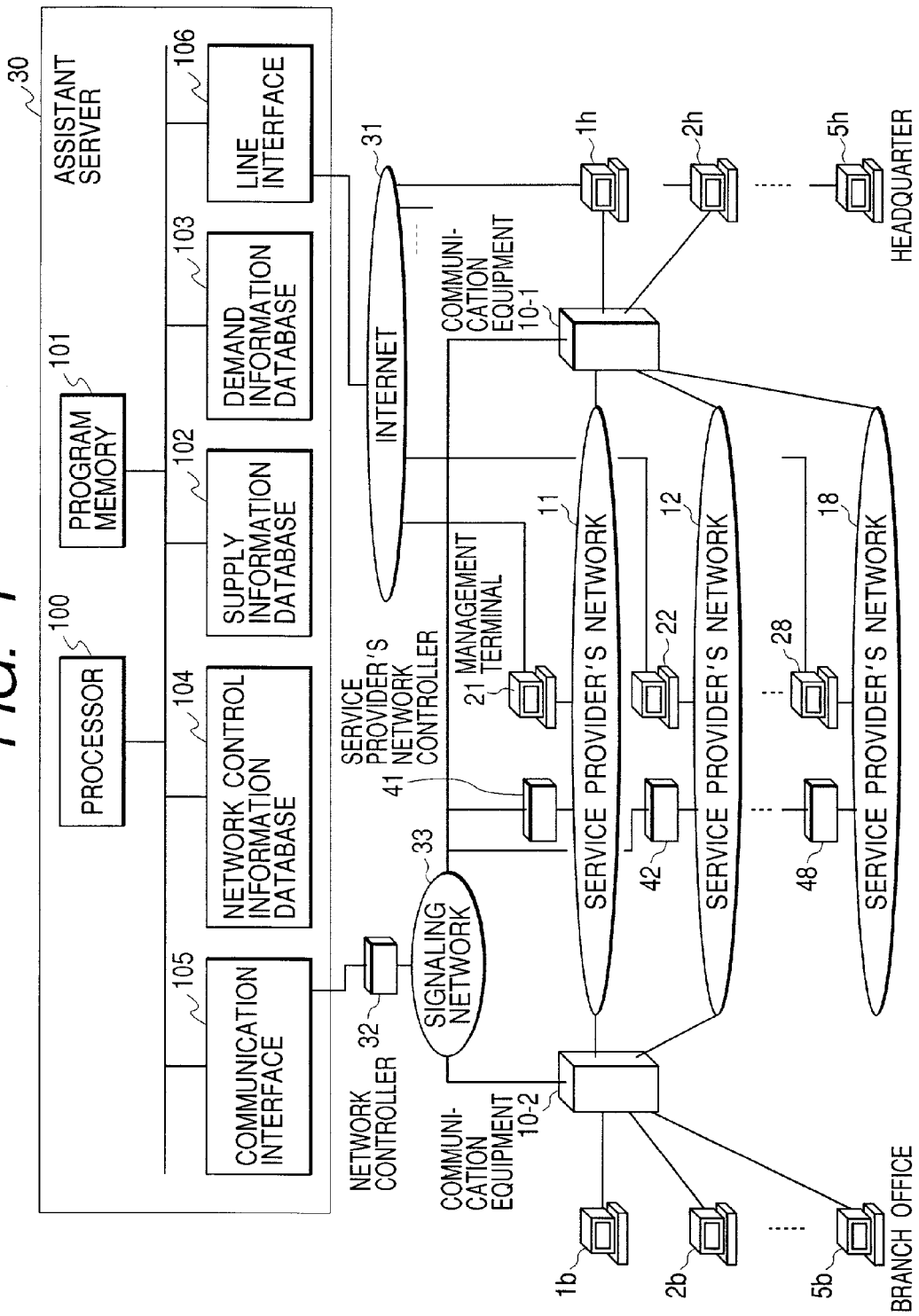
FIG. 1 is a diagram showing an example of the general configuration of a communication network system according to the invention.

FIG. 1 shows an example of the general configuration of a communication network system to which the invention is applied.

In FIG. 1, it is assumed that $1h$ to $5h$ denote terminals located at the headquarters of a company X and $1b$ to $5b$ are terminals located in a branch office of the company X. The terminals $1h$ to $5h$ at the headquarters are connected to a plurality of communication networks 11 to 18 of different telecommunication companies including communication common carriers and Internet service providers, via a communication equipment 10-1. The terminals $1b$ to $5b$ at the branch office are connected to the plurality of communication networks 11 to 18 via a communication equipment 10-2. The terminals $1h$ to $5h$ are connected to, for example, an assistant server 30 via a communication network 31 such as the Internet. The assistant server 30 communicates with a network controller 32 connected to the communication equipments 10-1 and 10-2 via, for example, a signal network 33 according to signaling system No. 7.

In the invention, the user A of the terminal $1h$ requests the assistant server 30 for communication service (assurance of a communication path) between the headquarters and the branch office. The communication service is requested by designating communication path specifications such as a communication service area, a service term, a communication bandwidth, and quality of service. Users B to E of the other terminals $2h$ to $5h$ also demand the assistant server 30 for communication service between the headquarters and the branch office adapted to the needs in a manner similar to the user A.

According to the invention, as will be described hereinlater, the assistant server 30 receives the communication service request from each user and establishes a communication path matching the request between the communication equipments 10-1 and 10-2 via the network controller 32.

To the communication networks 11 to 18, for example, management terminals 21 to 28 each for managing the state of the corresponding communication network such as the use state of a bandwidth, and service providers' network controllers 41 to 48 are connected, respectively. These management terminals are connected to the assistant server 30 via the network 31. Telecommunication companies "a" to "h" which own the communication networks 11 to 18, respectively, monitor the states of resources in their communication networks, input definition information of communication service (hereinafter called supply information) which can be provided such as a usable line bandwidth from the management terminals 21 to 28 at any time, and transmit the supply information to the assistant server 30 via the communication network 31.

The assistant server 30 has a processor 100, a program memory 101, a supply information database 102, a demand information database 103, a network control information database 104, a communication interface 105 for performing communication with the network controller 32, and a line interface 106 for connection to the Internet 31.

Supply information related to communication service notified from the telecommunication companies "a" to "h" is stored in the supply information database 102. The contents of the communication service requests received from the users A to E are stored in the demand information database 103. Network control information necessary to control a communication network is stored in the network control information database 104. Control programs to be executed by the processor 100 for retrieving supply information matching the request from the user, generating and managing network control information, and the like are stored in the program memory 101. In the basic operation of the invention, the demand information database 103 is not always necessary.

As will be stated in detail hereinlater, the communication service business and the communication system according to the invention can provide a combination of a plurality of communication services of different telecommunication companies to a user and transfer transmission packets from the user to a destination apparatus via a plurality of communication paths.

Figure 2:
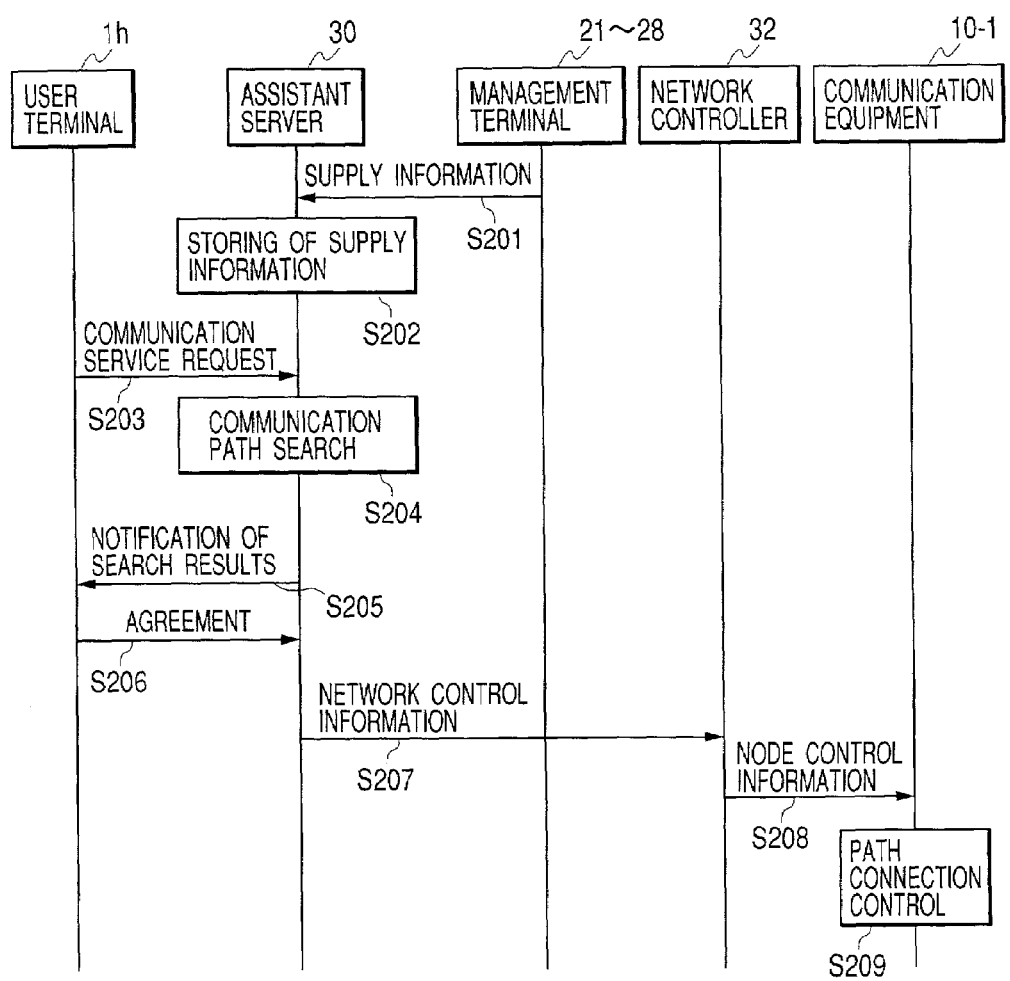
FIG. 2 is a diagram showing a control sequence in the communication network system according to the invention.

FIG. 2 shows an example of a control sequence in the communication network system of the invention.

When information supplied from the management terminals 21 to 28 is received (step S201), the processor 100 of the assistant server 30 stores the received supply information into the supply information database 102 (S202).

When a communication service request is received from one of the terminals 1h to 5h, for example, from the terminal 1h (S203), the processor 100 searches the supply information database 102 for a communication network (communication path) satisfying the conditions designated by the communication service request (S204). At this time, in consideration of an already used or reserved line bandwidth out of the line bandwidths shown in the supply information from the telecommunication companies by referring to the network control information database 104, a communication network or a communication path satisfying the communication service request is retrieved.

When new supply information is notified from one of the telecommunication companies, the contents of the supply information database 102 is updated and a communication network (communication path) satisfying the communication service request is retrieved on the basis of the latest line bandwidth indicated by the new supply information.

After completion of the search, the search result, that is, definition information of an available communication path for the user is presented to the requester terminal 1h (S205). When a notification of agreement on the presented communication path is received from the requester terminal 1h (S206), the processor 100 generates network control information for assuring the communication path and transmits it to the network controller 32 (S207).

The network controller 32 manages both configuration information of communication networks under control and configuration information of the communication equipments 10 (10-1, 10-2, . . . ) under control. When the network control information is received from the assistant server 30, the network controller 32 generates node control information-for establishing the communication path designated by the network control information between the communication equipments 10-1 and 10-2 and transmits the node control information to the communication equipment 10-1 (S208) At this time, as necessary, the network controller 32 transmits telecommunication company's network control information including a service identifier or routing identifier to one of the telecommunication company's networks controllers 41 to 48 corresponding to the communication path.

On receipt of the node control information, the communication equipment 10-1 performs a path connection control for transferring received packets from the terminal 1h to the designated communication path under the designated conditions (S209). In step S208, alternately, the network control information may be transmitted to any one of the management terminals 21 to 28 connected to the communication network providing the designated communication path to control the communication equipment 10-1 via the management terminal.

FIG. 3 is a flowchart showing the detailed procedure of the searching step S204.

On receipt of the communication service request from the terminal 1h, the processor 100 of the assistant server 30 sequentially reads out supply information entries stored in the supply information database 102 (S301) and searches an available path matched with the communication path specifications designated by the communication service request (S302). In the case where an available path matched with the request is retrieved, a search result message indicative of definition information of the available communication path is notified to the terminal 1h (S303), and the process is terminated.

In the case where, in step S302, no supply information entry indicative of an available path matched with the request is retrieved in the supply information database 102, the processor 100 makes a check to see whether or not a communication path matched with the communication service request can be realized by a combination of a plurality of supply information entries (S304). When the request can be satisfied by the combination of the plurality of supply information entries, the processor 100 transmits the search result message indicative of the definition information of the available communication service by using the plurality of communication paths to the terminal 1h (S303), and terminates the process.

In the case where the request cannot be satisfied even by a combination of the plurality of the supply information entries in step S304, a message indicating that the requested communication service is not acceptable is notified to the requester terminal (S305) and the process is terminated.

FIG. 4 shows the contents of the supply information database 102 of the assistant server 30.

In the supply information database 102, a plurality of entries indicative of supply information received from the management terminals 21 to 28 are stored. Each supply information entry includes information such as, for example, a service provider name (service provider identifier) 400, a service area 401, a service term 402, a bandwidth 403 offered, quality of service (QOS) 404, and a service share indication 405 indicating whether the communication service can be shared by a plurality of users or not.

FIG. 5 shows the contents of the demand information database 103 of the assistant server 30.

In the demand information database 103, a plurality of entries indicative of the contents of the communication service requests received from the user terminals 1h to 5h are stored. Each entry includes information such as, for example, a user name (user ID) 500, a service area 501, a service term 502, a required bandwidth 503, QOS 504, the necessity of a backup route 505, a combination service indication 506 indicating whether a combination of a plurality of communication services (communication paths) is allowed or not, a source address 507 and a destination address 508 to be added to transmission packets, and the like.

In the supply information database 102 and the demand information database 103, for example, the bandwidths 403 and 503 may be specified in more detail like a guaranteed bandwidth, a peak bandwidth, and the like, thereby providing various types of communication services.

FIG. 6 shows the contents of the network control information database 104 of the assistant server 30.

In the network control information database 104, network control information generated on the basis of the contents of the communication service request from the user and the search result of the supply information database 102 is stored.

Each of the entries in the network control information database 104 includes a user name (user ID) 600, a service term 601, a service area 602, a service ID 603 assigned to each contracted communication service, first path definition 604, second path definition 605, QOS 610, the necessity of a backup route 611, and a source address 612 and a destination address 613 to be added to transmission packets.

The first path definition 604 includes a service provider identifier 606A, a bandwidth 607A, and a path ID 608A, and the second path definition 605 includes a service provider identifier 606B, a bandwidth 607B, and a path ID 608B. When the communication service requested by the user is granted by a combination of two communication paths, the two communication paths are defined by the first path definition 604 and the second path definition 605. When the requested communication service is satisfied with a single communication path, no data is entered in the second path definition 605.

Figure 7:
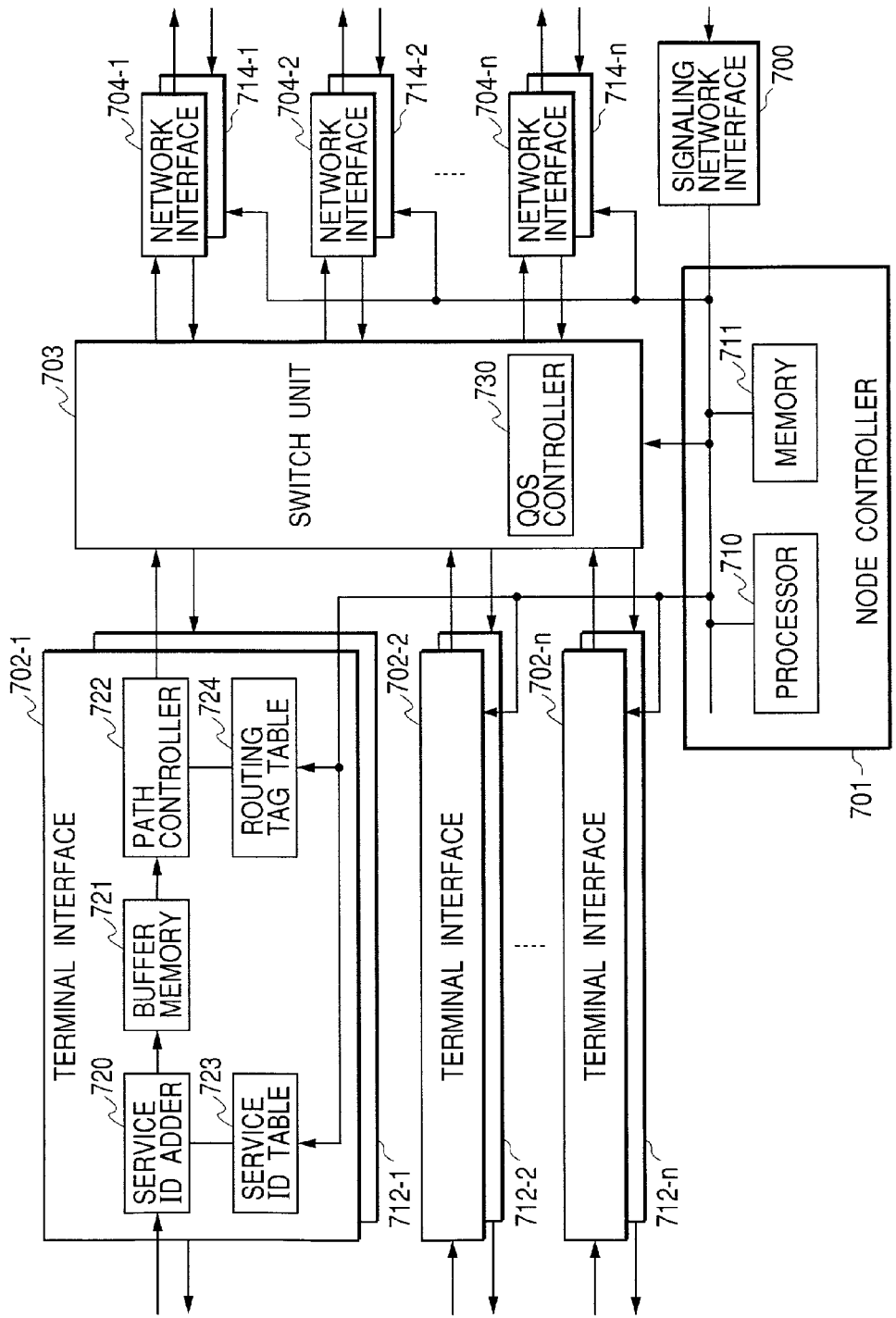
FIG. 7 is a diagram showing the configuration of a communication equipment 10.

FIG. 7 shows the configuration of the communication equipment 10 (each of 10-1 and 10-2).

The communication equipment 10 includes a signaling network interface 700 for connection to the signaling network 33, a node controller 701, a plurality of terminal interfaces 702-1 to 702-n and 712-1 to 712-n for connection to user terminals, a switch unit 703, and a plurality of network interfaces 704-1 to 704-n and 714-1 to 714-n for connection to the service providers' networks 11 to 18. The node controller 701 includes a processor 710 and a memory 711 and controls the whole function of the communication equipment.

The signaling network interface 700 transfers the node control information received from the network controller 32 via the signaling network 33 to the node controller 701. The processor 710 of the node controller 701 analyzes the node control information received from the signaling network interface 700 and transmits internal control information necessary for a packet transfer control to the switch unit 703 and the terminal interface 702 in association with a communication path to be newly set.

The terminal interface 702-i (i=1 to n) for an input line has a service ID adder 720, a buffer memory 721, a path controller 722, a service ID table 723, a routing tag table 724, and the other elements. In the service ID table 723, in correspondence with a source address and a destination address to be included in the header of input packets, service ID given as internal control information from the processor 710 is stored. In the routing tag table 724, in correspondence with the service ID given as internal control information from the processor 710, the bandwidth, path ID, and routing tag information given as internal control information from the processor 710 are stored.

Figure 8A:
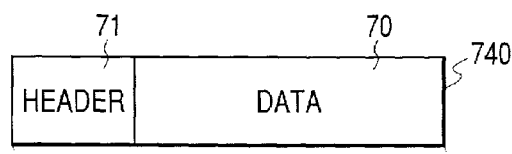
FIG. 8A to FIG. 8D are diagrams showing the formats of an input packets internal packets, and an output packet of the communication equipment 10, respectively.
Figure 8B:
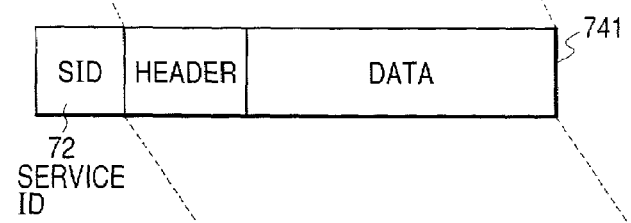

To the service ID adder 720, as shown in FIG. 8A, a packet 740 constructed by data 70 and a header 71 is supplied. When the packet 740 is received from a terminal, the service ID adder 720 reads out service ID 72 corresponding to the source address and the destination address included in the header 71 of the input packet from the service ID table 723 and outputs a packet 741 obtained by adding the service ID (SID) 72 as shown in FIG. 8B to the buffer memory 721.

Figure 8C:
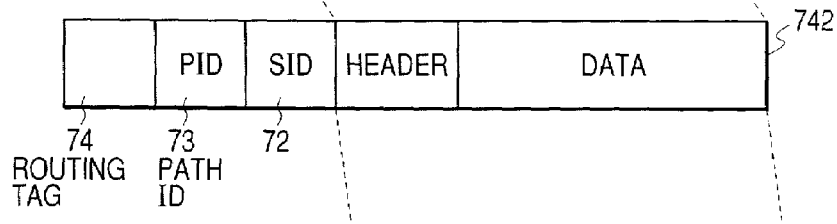

The path controller 722 reads out the packet 741 stored in the buffer memory 721 and refers to the routing tag table 724 on the basis of the service ID 72. In the routing tag table 724, in correspondence with the service ID 72, a control information entry including bandwidth, path ID, routing tag information, and a counter is stored. The path controller 722 counts the number of packets for each service ID by the counter, and outputs a packet 742 to the switch unit 703. The packet 742 includes, as shown in FIG. 8C, path ID (PID) 73 and routing tag information 74 as internal header information.

The switch unit 703 switches the packet input from each of the terminal interfaces 702-1 to 702-n in accordance with the routing tag information 74 and outputs the packet to one of the network interfaces 704-1 to 704-n. The switch unit 703 has a QOS controller 730 and controls the QOS of an input packet from the terminal interface in accordance with the QOS information for each service ID (or routing tag information) previously notified by the internal control information from the processor 710. For example, when congestion of packets occurs in a specific output line, a priority control in the packet transfer is performed in such a manner that, out of competing packets, packets of voice, image, and the like which are not allowed to be delayed are preferentially transmitted and data packets which are allowed to be re-transmitted are discarded.

The network interface 704-i (i=1 to n) for an output line eliminates the internal header information 72 to 74 from the packet 742 received from the switch unit 703, converts the packet 742 into a packet format according to the communication protocol of the telecommunication company's network, and transmits the packet to the telecommunication company's network.

Figure 8D:
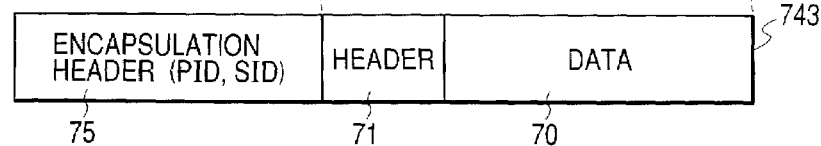

When the packet transfer is performed according to, for example, MPLS (Multi Protocol Label Switching) over a telecommunication company's network, a packet 743 in a format obtained by encapsulating the input packet 740 with an shim header 75 as shown in FIG. 8D is transmitted from the network interface 704-i. In this case, the service ID 72 and the path ID 73 added as the internal header information may be used for label allocation in the shim header.

A first embodiment of the communication path control according to the invention will now be described in detail. In the first embodiment, communication services of a plurality of telecommunication companies, for example, communication paths of the telecommunication companies "a" and "b" are combined and provided in response to the request of the user A.

FIG. 9 shows an example of an entry screen of supply information of the telecommunication company "a" in the management terminal 21.

An entry screen 80 of supply information includes data entry areas of name 81 of a service provider, a service area 82, a service term 83, bandwidth 84, QOS 85, and service share 86, a cancel button B10, and enter button B11.

The service provider "a" enters, for example, "Tokyo-Osaka" as the service area, "Apr. 1st, 2001 to Mar. 31st, 2003" as the service term, "2 Mbps" as the bandwidth, "guaranteed" as QOS, and "Yes" as the service share, and clicks the enter button B11 by a mouse operation. By the operation, the entry data is transmitted as supply information to the assistant server 30. The cancel button B10 is clicked when the provider wish to cancel the transmission of the supply information to the assistant server.

When the supply information of the service provider "a" entered from the management terminal 21 is received (S201), the processor 100 of the assistant server 30 stores the received supply information as an entry 102a shown in FIG. 4 into the supply information database 102 (S202). Supply information of the service providers "b" to "h" entered from the management terminals 22 to 28 is also received by the assistant server 30 and stored as entries 102b to 102h into the supply information database 102.

FIG. 10 shows an example of the entry screen of the communication service request information in the terminal 1h operated by the user A.

An entry screen 90 of communication service request information includes data entry areas of the user name (user ID) 91, service area 92, service term 93, bandwidth 94, QOS 95, combination service 96, the necessity of a backup route 97, source address 98, and destination address 99, a cancel button B12, and an enter button B13.

The user A enters, for example, "Tokyo-Osaka" as the service area, "Apr. 1st, 2001 to Mar. 31st, 2003" as the service term, "5 Mbps" as the bandwidth, "guaranteed" as QOS, "Yes" as the combination service, and "No" as a backup route, and clicks the enter button B13. By the operation, the entry data is transmitted as service request information to the assistant server 30.

When the communication service request of the user A is received from the terminal 1h (S203), the processor 100 searches the supply information database 102 for a supply information entry of the communication service satisfying the request (S204 and S302).

Since there is no supply information entry matched with the request of the user A in the supply information database 102 in the example shown here, the processor 100 retrieves communication service satisfying the request from combinations of a plurality of supply information entries (S304). In this case, the request of the user A is satisfied by a combination of the supply information entry 102a of the service provider "a" and a supply information entry 102b of the service provider "b". Consequently, the processor 100 transmits a search result indicative of the combination to the terminal 1h of the user A (S205).

FIG. 11 shows an example of the display screen of the search result displayed on the terminal 1h.

A display screen 110 of the search result includes a display area 120 of the contents of a request of the user A, a display area 130 of the search result, an order button B14, a request change/re-search button B15, and an end button B16. In this example, the bandwidth of 5 Mbps required by the user A is assured by using 2 Mbps of the communication network 11 of the service provider "a" and 3 Mbps of the communication network 12 of the service provider "b".

When the user A agrees to the combination of the two communication networks and clicks the order button B14, a notification of the agreement is transmitted to the assistant server 30. In the case where the user A desires to change the request condition, the user A clicks the request change/re-search button B15.

When the agreement notification is received from the terminal 1h (S206), the processor 100 generates network control information on the basis of the request contents of the user A and the search result (S207) and transmits it to the network controller 32 (S208)

The network control information generated in correspondence with the request of the user A has, for example, the contents shown by an entry 104a in FIG. 6.

The contents designated by the service request from the user A are entered as the user name 600, service area 601, service term 602, QOS 610, backup route 611, source address 612, and destination address 613. The data of the service providers 606A and 606B and the bandwidths 607A and 607B are obtained from the search result. Values of the service ID 603 and first and second path IDs 608A and 608B are values assigned to each network control information entry by the processor 100.

Figure 12:
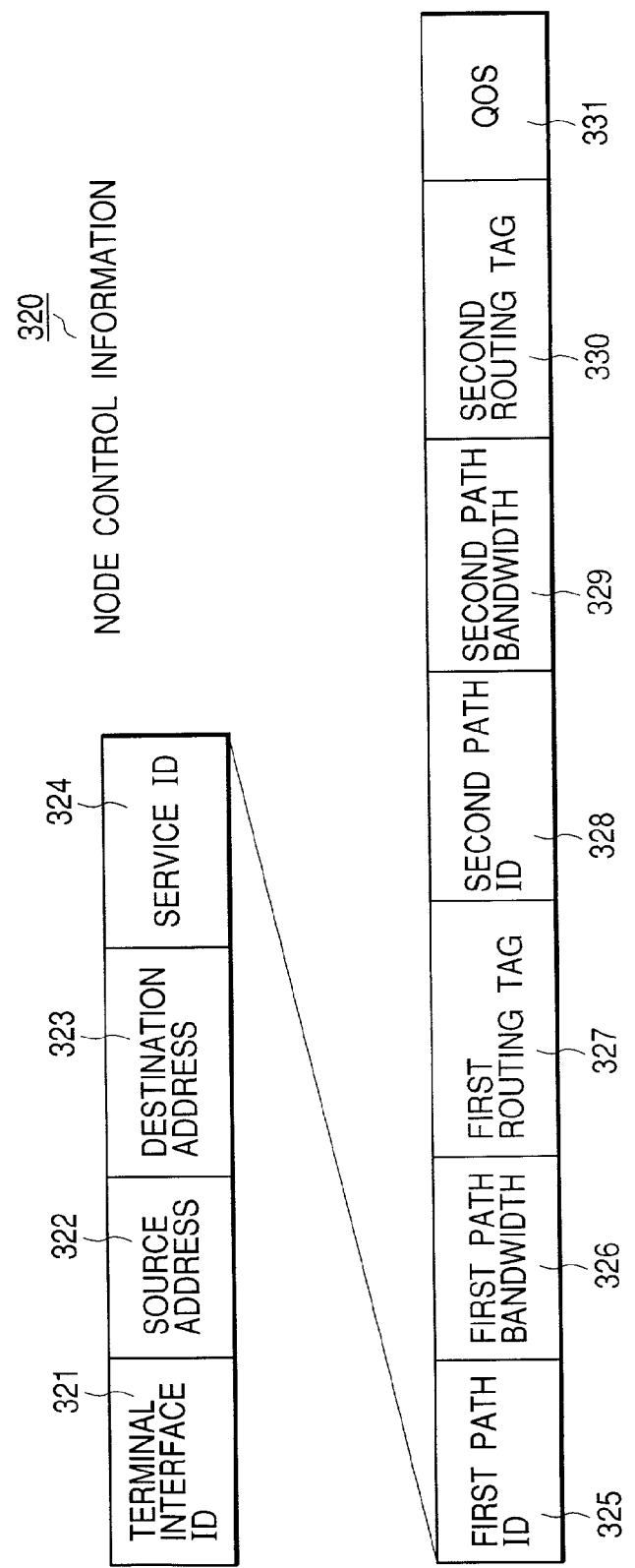
FIG. 12 is a diagram showing an example of node control information supplied from a network controller 32 to the communication equipment 10.

When the network control information is received, the network controller 32 generates, for example, node control information 320 shown in FIG. 12 on the basis of the received network control information and transmits it to the communication equipment 10-1 (S209) At this time, the network controller 32 refers to the configuration information of the communication network and each of communication equipments under control, checks the connection relation between the communication network 11 of the service provider "a" designated by the first path definition 604 in the network control information and the communication network 12 of the service provider "b" designated by the second path definition 605, and specifies a terminal interface ID 321, first routing tag information 327 for transferring input packets from the terminal 1h to the communication network 11 by the communication equipment 10-1, and second routing tag information 330 for transferring input packets from the terminal 1h to the communication network 12.

As shown in FIG. 12, the node control information 320 transmitted from the network controller 32 to the communication equipment 10-1 defines the relations among the ID 321 of the terminal interface connected to the user terminal 1h, a source address 322 (612) a destination address 323 (613), service ID 324 (603) first path ID 325 (608A), first path bandwidth 326 (607A), the first routing tag information 327, second path ID 328 (608B), second path bandwidth 329 (607B) the second routing tag 330, and QOS 331 (610).

In the communication equipment 10-1, the node control information 320 received by the signaling network interface 700 is stored in the memory 711. The processor 710 of the communication equipment 10-1 analyzes the node control information 320 and transmits first internal control information containing the data of the source address 322 to the second routing tag information 330 to the terminal interface 702-1. The processor 710 transmits second internal control information designating the relation between the service ID 324 (or the first and second routing tag information 327 and 330) and the QOS information 331 to the switch unit 703. The terminal interface 702-1 and the switch unit 703 perform a path connection control for transferring input packets from the terminal 1h at a predetermined ratio of the bandwidths of the communication networks 11 and 12 in accordance with the internal control information received from the processor 710, for example, sets parameters in the tables 723 and 724 and QOS controller 730 (S210).

In the embodiment, on receipt of the packet 740 from the terminal 1h, the service ID adder 720 of the terminal interface 702-1 refers to the service ID table 723, adds service ID "1" to the received packet, and outputs the packet to the buffer memory 721. The path controller 722 reads out the packet from the buffer memory 721, refers to the tag table 724 in accordance with a service ID added to the packet, counts the number of packets, adds the first path ID and first routing tag information to the packets destined for the communication network 11, adds the second path ID and second routing tag information to the packets destined for the communication network 12 in order to distribute a train of packets having the service ID "1" entered at a transfer rate of 5 Mbps to the communication networks 11 and 12 at the ratio of 2 Mbps:3 Mbps, and outputs the packets to the switch unit 703.

The switch unit 703 transfers a packet to which the first routing tag information is added to the communication network interface 704-1 and transfers a packet to which the second routing tag information is added to the communication interface 704-2. At this time, by the QOS controller 730 in the switch unit 703, a control for assuring the bandwidth is performed. The communication network interfaces 704-1 and 704-2 eliminate unnecessary header information from packets received from the switch unit 703, convert the packet into a packet format according to the communication protocol, and transmits the packets to the communication networks 11 and 12, respectively.

By the above control sequence, the user A can communicate with the terminal at a branch office under the conditions designated by the communication service request.

FIG. 13 shows another embodiment of the control sequence in the communication network system of the invention.

In this embodiment, the demand information database 103 is used. When the supply information is received from the management terminals 21 to 28 (step S1101), the processor 100 of the assistant server 30 stores the received supply information into the supply information database 102 (S1102). When a communication service request which is called demand information here is received from one of the terminals 1h to 5h (S1103), the received demand information is stored in a demand information database 1203 (S1104) When a matching request is received from a source terminal of a communication service request (S1105) the processor 100 reads out demand information to be matched from the demand information database 103 and, in a manner similar to the searching step S204 in FIG. 2, retrieves a communication path satisfying the conditions designated by the demand information or combined communication paths by matching the demand information with supply information read out from the supply information database 102 (S1106).

The processor 100 transmits the search result to the terminal of the request source (S1107). When an order request is received from a request source terminal (S1108), a service request including the search result is transmitted to any of the management terminals 21 to 28 corresponding to the supply information (S1109) When the notification of agreement is received from the management terminal (S1110), the processor 100 generates network control information on the basis of the demand information and the search result and stores the network control information to the network control information database 104 (S1111).

The processor 100 checks the service term 602 in the network control information database 104 at predetermined cycles (S1112). If there is an entry to which the communication service is to be started, the processor 100 generates a message of network control information and transmits it to the network controller 32 (S1113). When the network control information is received, as described by referring to FIG. 2, the network controller 32 generates node control information and transmits it to the communication equipment 10 (S1114). In a manner similar to step S209 in FIG. 2, the communication equipment 10-1 executes a path connecting control according to the received node control information (S1115). When there is an entry of which communication service is to be finished in the network control information database 104, the processor 100 generates a message of network control information for canceling the corresponding communication path and sends it to the network controller 32 in step S1113.

With reference to FIGS. 4 to 6, further different embodiments of the communication path control according to the invention will be described hereinbelow.

In the second embodiment of the invention, a combination of a plurality of communication services offered by different telecommunication companies is shared by a plurality of users. When communication service of the telecommunication company "c" indicated by the entry 102c and communication service of the telecommunication company "d" shown in the entry 102d in FIG. 4 are combined, for example, a communication path of total 5 Mbps is available in the area between Tokyo and Osaka. Therefore, when communication service requests of 4 Mbps and 1 Mbps (total 5 Mbps) are issued from the users B and C in the area between Tokyo and Osaka as shown by entries 103b and 103c in FIG. 5, if the users B and C agree to share the communication paths of the telecommunication companies "b" and "c", the bandwidths required by the users B and C are assured.

Entries 104b and 104c in FIG. 6 show an example of network control information generated in correspondence with the users B and C. Transmission packets of the user B are distributed to the communication paths of the telecommunication companies "c" and "d" at the ratio of 1.6 Mbps:2.4 Mbps. Transmission packets of the user C are distributed to the communication paths of the telecommunication companies "c" and "d" at the ratio of 0.4 Mbps:0.6 Mbps.

In a third embodiment of the invention, by combining a plurality of communication paths of different service terms, a communication service request of a user or a plurality of users requiring a long service term is satisfied.

For example, as shown by an entry 103d in FIG. 5, when the user D desires communication service of the bandwidth of 1 Mbps in the term from Sep. 1st, 2001 to Aug. 31st, 2003 and the request of the user is satisfied by combining communication services of the telecommunication companies "e" and "f" as shown by entries 102e and 102f in FIG. 4, the assistant server generates the network control information indicated by entries 104d and 104D shown in FIG. 6. In this case, the user D performs communication with the branch office by using the communication network of the telecommunication company "e" in the term from Sep. 1st, 2001 to Aug. 31st, 2002 and using the communication network of the telecommunication company "f" in the term from Sep. 1st, 2002 to Aug. 31st, 2003.

The network is switched from telecommunication company "e" to the telecommunication company "f" by, for example, as described by referring to FIG. 11, registering a network control entry 104D in the network control information database 104, transmitting network control information of the entry 104D from the assistant server 30 to the network controller 32 and, on the day that the communication service of the telecommunication company "f" is started, transmitting the node control information for transferring input packets from the terminal of the user D to the interface to which the communication network of the telecommunication company "f" is connected, from the network controller 32 to the communication equipment 10.

Since the network control information entry 104D has the same service ID as that of the entry 104d, in the terminal interface to which the terminal of the user D is connected, routing tag information destined for the communication network of the telecommunication company "e" set in the path controller 722 is replaced by routing tag information destined for the communication network of the telecommunication company "f" designated by new node control information.

In a fourth embodiment of the invention, two communication paths each satisfying required bandwidth are assigned to one user. One of the communication paths is used as a working path and the other one is used as a backup path. When a failure occurs in the working communication path, the working communication path is switched to the backup communication path.

For example, as shown by an entry 103e in FIG. 5, when a service request from the user E indicates the necessity of a backup line, the processor 100 of the assistant node searches the supply information database 102 for two supply information entries satisfying the service request from the user E. When supply information indicated by, for example, the entries 102g and 102h in FIG. 4 is retrieved in response to the request, the processor 100 generates network control information indicated by the entries 104e and 104E in FIG. 6 and transmits the network control information to the network controller 32.

In this case, first node control information corresponding to the entry 104e and second node control information corresponding to the entry 104E is transmitted from the network controller 32 to the communication equipment 10-1. The communication equipment 10-1 performs a connection control in accordance with the first node control information designating the working communication path and stores the second node control information in a spare information area in the memory 711 in correspondence with the ID of the working communication path.

By the operation, the user E can perform communication by using the communication network of the telecommunication company "g" during the service term. In the event where a failure occurs in the communication network of the telecommunication company "g", in response to a notification of the failure from the interface connected to the failed line, the processor 100 reads out the second node control information as backup line information corresponding to the failed line from the backup information area of the memory 711 and sets it in the terminal interface to which the terminal of the user E is connected.

Since the network control information entry 104E has the same service ID as that of the entry 104e, the routing tag information destined for the communication network of the telecommunication company "g" set in the path controller 722 until then is replaced with routing tag information destined for the communication network of the telecommunication company "h" designated by the second node control information, thereby switching the working line to the backup line.

In the foregoing embodiments, the assistant server retrieves the telecommunication company network (supply information) matched with the communication service request from the user and automatically sets the communication path. The telecommunication company may request the assistant server to find demand information of the user matched with communication service provided by itself. It is also possible to provide the assistant server 30 with, for example, a database for service package information to preliminarily make a package of combination patterns of a plurality of communication services and the user.

As obvious from the foregoing embodiments, according to the invention, each user can save trouble required to make a contract again with the telecommunication company at the time of extending the term of the communication service or changing the conditions of the communication service. Further, each user can receive desired communication service instantly as necessary by communicating with the assistant server.

According to the invention, by combining network resources of a plurality of telecommunication companies, the needs of the users can be granted. Thus, each telecommunication company or service provider can effectively use its network resources.

What is claimed is:

1. A communication path control method in a communication network comprising first and second communication equipment connected through a plurality of communication networks belonging to different telecommunication companies, a network controller connected to each of said first and second communication equipment for selectively setting private communication paths on said communication networks, and a server for supplying network control information instructing said network controller to set a private communication path on one of said communication networks, said network controller selectively supplying communication path control information generated based on said network control information to said first and second communication equipment, said communication path control method comprising the steps of:

storing a plurality of information entries each indicative of definition of a communication path and communication service provided by each of said telecommunication companies through said communication networks into said server;

receiving, by said server, a communication service request issued from a user terminal connected to one of said first and second communication equipment, said communication service request designating specifications of a private communication path to be secured for the user terminal;

retrieving, by said server, at least one information entry defining a communication path and communication service that matches said communication service request, specifying a communication path defined by the retrieved information entry as an available path for the user terminal if the communication path can satisfy said communication service request, and specifying a combination of communication paths defined by at least two information entries as the available oath if no single information entry matches said communication service request and the combination of communication paths can satisfy said communication service request;

notifying said user terminal of information as to the available path by said server; and transmitting network control information generated based on said communication service request and the definition information of said available path from said server to said network controller in response to a notification of agreement to the available path from said user terminal, thereby securing for the user terminal at least one communication path between said first and second communication equipment as the private communication path, wherein each of said information entries includes a communication bandwidth available on the communication path, wherein said communication service request designates a bandwidth of the private communication path requested by said user terminal, and wherein said server selects, when no single information entry that matches said communication service request is found, a combination of communication paths defined by at least two information entries as the available path if the total communication bandwidths available by the combination of communication paths satisfies the requested bandwidth.

2. A communication service request processing method for a communication network including first and second communication equipment connected through a plurality of communication networks belonging to different communication service providers, and a network controller connected to each of said communication equipment, said communication service request processing method comprising the steps of:

transmitting information indicative of definition of communication service to be offered between said first and second communication equipment by each of said communication service providers from each of management terminals associated with said communication service providers to an assistant server connected to said network controller;

storing said information indicative of definition of communication service received from each of said management terminals as an information entry of a communication service definition by said assistant server;

receiving, by said assistant server, a communication service request issued from a user terminal connected to one of said first and second communication equipment, said communication service request designating specifications of requested communication service to be secured for the user terminal;

retrieving, by said assistant server, at least one information entry of the communication service definition matched with said requested communication service, specifying communication service defined by the retrieved information entry as an available communication service for the user terminal if the communication service definition can satisfy the requested communication service, and specifying a combination of communication service defined by at least two information entries as the available communication service if no single information entry matches with requested communication service and the combination of communication service can satisfy the requested communication service;

notifying said user terminal of information as to the available communication service by said assistant server;

receiving, by said assistant server, a notification of agreement to the available communication service from said user terminal;

transmitting network control information to secure for said user terminal the available communication service from said assistant server to said network controller; and supplying communication equipment control information generated based on said network control information from said network controller to said communication equipment, thereby to secure for said requested communication service a part of at least one communication path between said first and second communication equipment, wherein each of said information entries includes a communication bandwidth available in the communication service, wherein said communication service request designates a bandwidth required for the requested communication service, and wherein said assistant server selects, when no single information entry that matches said communication service request is found, a combination of communication paths defined by at least two information entries as the available path if the total communication bandwidths available by the combination of communication paths can satisfy the bandwidth required for the requested communication service.

3. A server for performing communication with a user terminal and supplying network control information to a network controller for controlling a communication node connected to both said user terminal and a plurality of communication networks belonging to different communication service providers, said server comprising:

memory means for storing a plurality of information entries each indicative of a definition of communication service and a communication path on the communication network provided by each of said communication service providers;

first means for searching, upon receiving from the user terminal a communication service request in which specifications of a private communication path to be secured for the user terminal are designated, said memory means for an information entry indicative of communication service and a communication path that matches with said communication service request, specifying a communication path defined by the retrieved information entry as an available path for the user terminal if the communication path can satisfy said communication service request, specifying a combination of communication paths defined by at least two information entries as the available path if no single information entry matches said communication service request and the combination of communication paths can satisfy said communication service request, and notifying said user terminal of information as to the available path; and second means for transmitting network control information generated based on said communication service request and the information of said available path to said network controller in response to a notification of agreement to said available path from said user terminal, wherein said network controller instructs said communication node, in response to the network control information received from said server, to secure at least one communication path for transferring packets received from said user terminal to another communication node through the communication path which satisfies said communication service request, wherein each of said information entries includes a communication bandwidth available in the communication service, wherein said communication service request designates a bandwidth required for the requested communication service, and wherein said first means selects, when no single information entry that matches said communication service request is found, a combination of communication paths defined by at least two information entries as the available path if the total communication bandwidths available by the combination of communication paths can satisfy the bandwidth required for the requested communication service.

* * * * *